3,728,140
PROCESSES FOR THE PRODUCTION OF AMYLOSE FILM

Mikihiko Yoshida, Okayama, Japan, assignor to Hayashibara Company, Okayama, Japan
No Drawing. Filed Jan. 26, 1971, Ser. No. 109,940
Claims priority, application Japan, Jan. 26, 1970, 45/7,163
Int. Cl. C08b 25/02
U.S. Cl. 106—210                                      8 Claims

ABSTRACT OF THE DISCLOSURE

Processes for the economical production of starch film with high transparency, comprising hydrolysis of various starches utilizing alpha-1,6-glucosidase, blending the hydrolyzate with amylomaize starch in which amylose is the main constituent or to commercially available amylose, the hydrolyzate being an amylose of which short chain amylose is its main constituent, and forming films with the mixture.

---

This invention relates to processes for the production of starch film with high transparency and can be obtained economically, comprising hydrolysis of various starches utilizing alpha-1,6-glucosidase to obtain a hydrolyzate which is an amylose having short chain amylose as its main constituent, blending the hydrolyzate with amylomaize starch in which amylose is the main constituent or to commercially available amylose, and forming films with the mixture.

Starch films, especially amylose films, are edible, have lower permeabilities to oxygen, carbonic acid gas, etc., and are highly oil resistant. Accordingly, studies were performed on the possibilities of using starches and amylose starches in films and coatings for various foods. Currently amylose starch is produced from hybrids of corn maize with amylose content of 50–80%, are commercially available and used as starting material for the formation of films. In this specification all percentages and parts are given by weight unless stated otherwise. However, since amylomaize starch is derived from a specific variety of corn hybrids and grown exclusively with the purpose to obtain amylose, the final starch product is expensive. Studies on processes for the production of amylose film performed by the present inventors resulted in the discovery of processes for the production of suitable films with improved transparencies and controllable water solubilities, comprising admixing with amylomaize starch short chain amylose obtained by hydrolyzing common starches with isoamylase.

The advantages of the present invention will be described in detail. Amylomaize starch with an amylose content of 80% is at present available experimentally, however, at present cultivation of this hybrid still requires specific seeds and spacious farms, therefore the price of this product is several times more expensive than common starch. Though there is a great potentiality of harvesting corn hybrids with higher amylose level, accelerating rise in prices may be expected resulting from the difficulty of their cultivation. On the contrary, by admixing according to the present invention amylose hydrolyzate obtained by hydrolyzing common starches with the employment of an enzyme which is produced abundantly from microorganisms to amylomaize starch, and other amyloses, it is possible to increase the amylose content in the final starch products and improve their compositions.

In the short chain amylose obtained by hydrolysis of common starches with the employment of alpha-1,6-glucosidase according to the present invention, amylopectin is absent, accordingly the product has a lower viscosity than amylomaize starch. Therefore the viscosity of amylomaize starch can be decreased by admixing with it said hydrolyzate, which eventually facilitates formation or casting into films.

The films formed from common starch and treating with an alkali solution, have in general low transparencies, which are disadvantages that decrease the value of the films to halves. By the admixture of amylose obtained by the alpha-1,6-glucosidase according to the invention, an improvement of the film transparency to nearly 100% is attainable, thus results in the doubling of the value of amylomaize films.

In addition, the films prepared by mixing such starch materials exhibit no permeability to oxygen or carbonic acid gas, which is an advantage to make the films most suitable as materials for producing films for food packaging and coatings. Thus protection against coloration, change in quality, drying and decomposition of foods, which mean deterioration of the food products, are possible.

Naturally the oil resistant properties of the films are desirable, which make the films most preferable for coating or packaging meats, cheeses, and butter.

The water solubilities of the films increase gradually with the increase of the amount of short chain amylose to be added, thus the water solubility is variable to a desirable level required in the specific application. The fact that the water solubilities of the films prepared in accordance with the invention are variable has great significance in relation to the fact that the films are edible. In other words, a film with the most desirable water solubility for packing instant coffee and black tea, or capsules for medicines can be selected from a line of films.

The tensile strength of the films formed with such starches varies to some extent with the increase of the amount of short chain amylose to be added. However, it was observed that an addition of about 60% of short chain amylose results the least level of tensile strength desirable for films.

The high amylose content starch, in which natural amylose is its main constituent, and which is desirable for the formation of films according to the invention is amylomaize starch obtained from corn hybrids. The films which have been developed and are currently commercialized are obtained using this amylomaize starch as a material. Besides this starch product, any variety of amylose separated from common starches using salt solutions of magnesium sulphate, etc., or by fractionation employing an amylose precipitator such as butanol, etc., or by separation of amylose from starch solutions employing hydro dynamic forces can be utilized in the present invention. These amyloses consist mainly of natural long chain amylose and 10–50% of amylopectin.

The process by which the short chain amylose to be mixed with the above mentioned long chain amylose starch is obtained is as follows. Amylopectin which is a branched structure combined with alpha-1,6-glucoside linkages is subjected to the action of the enzyme (alpha-1,6-glucosidase), e.g. isoamylase, pullulanase, etc., which debranches the alpha-1,6-glucoside linkages by hydrolysis to convert the amylopectin into amylose, that are linear chain structures of molecules. Accordingly by this enzymatic treatment natural common starches are changed into an amylose starch comprising 20–30% of long chain amylose and 70–80% of short chain amylose which has a polymerization degree (d.p.) of about 20–30 corresponding with the branched chain length of amylopectin. The hydrolyzed starch may be used in situ. However, the long chain amylose and short chain amylose separated by any of the following methods may be used independently; the 20–30% portion which is long chain amylose is precipitated by gradual cooling from said starch hydrolyzate, or the long chain amylose is separated by fractionation and precipitation with the aid of a precipitator, e.g. 1-butanol, etc., and eventually the short chain amylose is recovered from the supernatant liquid.

The admixture of these three types of amyloses, long chain and short chain amyloses, is effective in decreasing the visocity of amylomaize starch and is highly advantageous in the formation of films. The starch solution prepared by dissolving 20% of amylomaize starch in alkali solution or by a melting film formation method, has in each case a high viscosity and a difficulty of debubbling, requires a longer processing period as well as causing difficulty to the film casting procedure. However, the short chain amylose obtained by the above mentioned enzymatical treatment has no branched structure and in addition, because it is exclusively of short chain, and has a lower viscosity when prepared into solutions, the addition of short chain amylose to amylomaize starch reduces viscosity as well as greatly facilitates subsequent debubbling and casting procedures. On the other hand long chain amylose especially retrogrades easily at high concentration, and the films formed with this material are turbid. On the contrary when short chain amylose was added to this material retrogradation can be presented considerably as well as improving the transparencies of the films. Concerning the tensile strength of films, a 20–30% addition of short chain amylose aids formation of amylomaize starch films and has a tendency of strengthening the film tensile strength. However in case the amount of addition exceeds 50% the disadvantages of short chain amylose become evident and formation of films becomes difficult. Moreover the films lose tensile strength and become brittle. Therefore it is preferable to keep the amount of addition equivalent to or less than the amount of long chain amylose. In the case of adding short chain amylose obtained by the separation of long chain amylose from enzymatically treated common starch, it is desirable to maintain the amount of addition lower than 40%. For this purpose the long chain amylose separated from the hydrolyzate may be added. There is no specific limit to the amount to be added and transparent films are obtainable depending on the amount of addition.

The process for the production of short chain amylose will be described in detail. As starting material for the production of short chain amylose, any variety of starch from root starches produced from sweet potato, potato, cassava, etc., or any cereal or tuber starches from corn maize, wheat, sago, etc. may be of course employed. Since cereal or tuber starches are in general difficult to gelatinize and liquefy, it is preferable to liquefy them by heating within a temperature range of 130–170° C. with agitation. Liquefaction of root starches may be conducted by heating similarly or by incubation at 70–95° C. employing an alpha-amylase (liquefying enzyme), to a degree of hydrolysis (D.H.) less than 5.0. It is preferable to obtain the lowest DH as possible, desirably to around 2.0, since the retrogradation before enzymatic hydrolysis hinders subsequent emzymatic reaction. While care is taken to prevent retrogradation, the resultant liquefied starch solution is cooled rapidly to 50–60° C. using a vacuum flash cooler, adjusted to the pH value according to the variety of enzyme and then the enzyme, alpha-1,6-glucosidase, is added. The addition amount of enezyme is 10–50 units per gram starch. Since it is advantageous to use heat resisting enzyme particularly for industrial production, culture broth as enzyme solution which produced by the culture of strains, *Lactobacillus brevis*, *Nocardia asteroides*, *Actinomyces globisporus* which belong to genera Actinomycete may be used in situ or after purification by means of salting out with ammonium sulfate and of precipitation with an organic solvent. The optimum pH for *Pseudomonas amyloderamosa* is lower than 5.5 whereas reaction with other varieties of enzymes can be carried out at about 6.0. Amylose precipitates easily from starch hydrolyzate especially when using enzyme from Pseudomonas. In case mixtures of enzyme from Pseudomonas and other varieties of enzymes are used, the hydrolysis is more complete and in addition amylose precipitate forms easily.

The strains that produce alpha-1,6-glycosidases which may be employed similarly to the ones mentioned above are:

| | |
|---|---|
| *Escherichia intermedia* | ATCC 21073. |
| *Pseudomonas amyloderamosa.* | |
| *Streptomyces diastatochromogenes* | IFO 3337. |
| *Actinomyces globisporous* | IFO 12208. |
| *Nocardia asteroides* | IFO 3384. |
| *Micromonospora melanosporea* | IFO 12515. |
| *Thermonospora viridis* | IFO 12207. |
| *Actinoplanes philippinensis* | KCC ACT-0001. |
| *Streptosporangium roseum* | KCC ACT-0005. |
| *Agrobacterium tumefaciens* | IFO 3085. |
| *Azotobacter indicus* | IFO 3744. |
| *Bacillus cereus* | IFO 3001. |
| *Erwinia aroideae* | IFO 3057. |
| *Micrococcus lysodeikticus* | IFO 3333. |
| *Mycobacterium phlei* | IFO 3158. |
| *Sarcina albida* | IAM 1012. |
| *Serratia indica* | IFO 3759. |
| *Staphylococcus aureus* | IFO 3061. |
| *Lactobacillus brevis* | IFO 3345. |
| *Leuconostoc citrororum* | ATCC 8081. |
| *Pediococcus acididlactici* | IFO 3884. |
| *Streptococcus faecalis* | IFO 3128. |
| *Aerobacter aerogenes* | ATCC 8724. |
| *Corynebacterium sepedonicum* | IFO 3306. |
| *Aeromonas hydrophila* | IFO 3820. |
| *Flavobacterium esteroaromaticum* | IFO 3751. |
| *Acetobacter suboxydans* | IFO 3130. |
| *Vibrio metschnikovii* | IAM 1039. |
| *Enterobacter aerogenes* | ATCC 8724. |

The viscosity of starch solution decreases rapidly when the liquefied starch solution is incubated at 40–55° C. for 1–2 days following addition of alpha-1,6-glucosidase, which is an evidence of the progress of reaction. The desirable concentration of the liquefied starch solution to perform the reaction is 10–20%. A partial amount of the formed amylose precipitates on cooling after discontinuity of the reaction. The precipitate is centrifuged, supernatant is condensed, precipitated again, and amylose is recovered and washed with water. The first precipitate amylose thus obtained by separation has a higher degree of polymerization (D.P.) whereas the second precipitate of short chain amylose has an average D.P. of 20–30. The two varieties of amylose may be used separately or may be mixed together and used.

The process for the formation of films will be illustrated. Amylomaize starch containing 70% of amylose, 10, 20, 50 and 60% of starch hydrolyzate (average D.P., 35) respectively, was used as starting material. Separately amylomaize starch admixed with 10, 20, 40 and 60% of short chain amylose (average D.P. 25) respectively was used in film formation.

Alkali solution method and melting film formation method are methods widely known for film formation. However the method that will be described is the alkali solution method. The samples of mixtures with the above constituents were dissolved completely in 1–2 N sodium hydroxide solution (amylose concentration, 25%). After filtration and debubbling, the mixture was casted on glass plates to give a thickness of 0.4 mm., then coagulated by immersion in a sulphuric acid bath. The formed films were then stripped from the glass plates and dried following immersion in a glycerin bath. Results of comparison tests on the properties of equilibrated films at RH (relative humidity) 60% and 25° C, are given in the following table.

TABLE.—COMPARISON OF FILMS

| Samples | 1 | 2 | 3 | 4 | 5 |
| --- | --- | --- | --- | --- | --- |
| Contents of short chain amylose (percent) | 0 | 10 | 20 | 50 | 60. |
| Viscosity (Film formation property) | High (Moderate) | High (Moderate) | Moderate (Fair) | Moderate (Moderate) | Low (Poor). |
| Light permeability (Wave length m/u) | 55 | 75 | 87 | 90 | 92. |
| Tensile strength (p.s.i.) | 8,400 | 8,500 | 8,300 | 8,000 | 4,000. |
| Elogation rate (percent) | 16 | 17 | 15 | 13 | 12. |
| Gas permeability ($O_2$) | 0 | 0 | 0 | 0 | 0. |
| Solution rate with hot water | Slow | Moderate | Moderate | Slightly quick | Quick. |

As shown in the above results of experiments, dissolution of starch using only amylomaize at a concentration of 25%, was extremely difficult since the starch solution was highly viscous. Therefore concentration was adjusted to 20%. Treatment of other samples were possible with concentration of 25% and in addition film formation coud be performed easier. Though tensile strength of dry films increases somewhat with the increase of the percentage of short chain amylose, at 20% hardly any difference was observed and when the percentage exceeded 50%, tensile strength decreased rapidly. Degree of elongation decreased with the increase of amylose percentage. When the percentage exceeded 50%, the films increased their brittleness, thus exhibiting loss of the properties required for films. Oxygen permeability of the films were nil as in the case of amylomaize film. The film prepared from a starch solution to which was added up to 40% of short chain amylose (D.P. lower than 30) was similar to the ones with the addition of 50% (Sample 4) of short chain amylose (D.P. 35). Light permeated almost completely through both films, which showed that the films had twofold higher light permeability compared to that of the film prepared exclusively with amylomaize starch. Thus it is evident that the former films exhibit sufficiently the superior characteristics of film required for practical uses.

An explanation will now be given about the experimental examples of this invention.

EXPERIMENTAL

Example 1.—Process for the production of short chain amylose (I) from common starches Amylomaize starch with an amylose content of 70% was used in the example. Short chain amylose was produced from corn starch as follows. A 30% concentration aqueous corn starch solution was adjusted to pH 5.0 and liquefied by heating at 170° C. for 10 minutes using a continuous liquefying apparatus to give a D.H. of 1.0. The resultant was charged into a flash cooler, where it was cooled rapidly to 60° C. After adjusting the pH of the viscous solution to 5.0, 20 units of culture both of *Pseudomonas amyloderamosa* per gram starch was added and incubated at 50° C. With the progress of the reaction the viscosity decreased rapidly. After 40 hours the reaction was discontinued and the resultant was cooled slowly for 15 hours to 5° C. The formed precipitate was centrifuged. The supernatant was condensed to 15% and cooled similarly. Amylose that precipitated from the solution was recovered and washed with water. The amylose product had a average D.P. of 37 with some part of long chain amylose. However, in the product, branched amylopectin was nearly absent. This amylose was defined as amylose (I) and used in further experiments. The employment of enzyme from Pseudomonas genus especially formed amylose that precipitated easily and facilitated subsequent processing.

Example 2.—Process for the production of short chain amylose (II) from waxy starch A waxy starch slurry was adjusted to pH 6.0 and 0.2% of liquefying enzyme was added per gram starch. The mixture was liquefied at 90° C. by charging to it raw steam. Care was taken to maintain the D.E. (dextrose equivalent) to the lowest level possible, then the enzyme was inactivated by heating. Special care was taken to cool rapidly the resultant to 55° C. and its pH was adjusted to 5.5. 10 units of different enzyme enzymes obtained by cultivation of strains of *Pseudomonas amyloderamosa* and *Nocardia asterides* (IFO 3384) were added and the mixture was incubated at 50° C. for 40 hours. After reaction the mixture was inactivated and cooled gradually for 20 hours to 5° C. The formed precipitate was centrifuged and washed with a small amount of water. It was then dried with warm air and white powder with a moisture content of 20% was obtained. The product had a D.P. of 27 in which branches were nearly absent. This amylose was defined as amylose (II).

Example 3.—Process for the production of a short chain amylose (III) from potato starch A 10% starch suspension was prepared with potato starch. The suspension was heated and liquefied with a continuous heater equipped with a multi-bladed-agitator, then cooled rapidly to 50° C. and 20 units of enzyme from *Aerobacter aerogenes* (ATCC 8724) was added per gram starch. The mixture was incubated for 40 hours at pH 6.0 and 50° C. Following incubation for 40 hours at pH 6.0 and 50° C., the enzyme within the mixture was inactivated by heating and cooled gradually. The precipitate that formed overnight was centrifuged, washed with water and dried. The product had 20% moisture content and an average D.P. of 28 with hardly any branches. This was defined as amylose (III).

Example 4.—Process for the formation of films According to the following method films were formed According to the following method films were formed using amylomaize starch (amylose content 70%) and a mixture comprising 90% of said amylomaize starch and 10% of short chain amylose (I) as starting material. These starch materials were dissolved in an alkali solution comprising 0.1 g. of sodium sulfite, 6 g. of sodium hydroxide, 6 g. of glycerin and 68.9 g. of water to give 20% solutions. The solutions were filtered at 30° C., allowed standing overnight, debubbled, and then cast on glass plates to thickness of 0.4 mm. The films were coagulated by immersing them in coagulating baths consisting of 21% of sodium sulphate, 13% of sulfuric acid and 66% of water, for 10 minutes, then washed with flowing water for 20 minutes. Following coagulation the films were immersed in 13% glycerin solutions and then dried at 30° C. The results of film forming process showed that the films (A) produced from amylomaize starch exclusively had higher viscosities, and debubbling and film formation procedures were accompanied with considerable difficulties. On the other hand the films (B) prepared with the mixture containing 10% of amylose (I) had lower viscosities, therefore, it was possible to form films similarly at a concentration of 25%. Comparison tests of the films showed that the transparency of the films (A) were inferior and opaque, whereas films (B) were nearly 100% transparent, with somewhat improved intensities and flexibilities. When immersed in warm water films (A) became turbid, but films (B) appeared to dissolved maintaining their transparencies.

Example 5.—Process for the production of amylomaize films with higher content of amylose (I)

Samples were prepared according to the same method described in Example 4 comprising amylomaize starch and 20, 50 and 60% of amylose (I) respectively. The samples were prepared into alkali solutions with concentrations of 25% according to the method described in the preceding example. Films dried at relative humidity (R.H.) 60%, 30° C. were compared, with the results listed in Table 1. Viscosities of the amylose alkali solution decreased and film formabilities improved with the increase of the content of amylose (I). No significant difference was observed in intensities increasing the amylose (I) content up to 50%. However when the amylose (I) content exceeded 60%, their film formabilities became inferior, tensile strength decreased, and brittleness increased, thus the films lost the required characteristics of being films suitable to be commercialized. Water solubilities increased with the increase of the amylose (I) content, however these films maintained their film state even in warm water and dissolved gradually.

Example 6.—Process for the formation of films containing amylose (II)

Samples containing 10, 20, 40 and 60% of amylose (II) (average D.P. 27) and the remainders being amylomaize starch were prepared according to the method described in Example 4 and dissolved in alkali solutions at concentration of 25%. After coagulation with sulphuric acid the samples were formed into films similarly, then compared following drying. The film formation and dissolving procedures exhibited the same results as in the cases when amylose (I) was added. With the increase of amylose content, viscosities decreased. The addition of amylose (II) facilitated the film formation procedure. However, in case the amylose (II) content exceeded 50% it became difficult to form films. In addition tensile strength, brittleness and flexibilities of the films decreased rapidly when the addition exceeded 40%. These properties correspond approximately to those of films containing 50% of amylose (I).

Determination of oxygen permeabilities of the films were nearly zero. Water solubilities increased slightly by increasing the amount of amylose added. However, a tendency of increase of moisture absorbancy was observed.

Example 7.—Process for the formation of films with mixtures of commercialized amylose and short chain amylose (III)

In the example commercialized amylose (amylose content 90%) and short chain amylose (III) (Example 3) were used. Samples containing 10, 20, 50 and 60% of short chain amylose (III) were prepared, and formed into films according to the method described in Example 4. Their operation handibilities, film formabilities and physical properties were compared, resulting in the findings that, there was no significant difference between these films and the films prepared with mixtures of amylomaize starch and amylose (I).

Example 8.—Formation of films from amylomaize starch and long chain amylose

To 100 parts of amylomaize starch was added the initial precipitate (long chain amylose) obtained in Example 1. Films were formed similarly as in the preceding example. Films with high intensities and satisfactory transparencies were obtainable.

What is claimed is:

1. In the process for the formation of amylose films comprising forming a film from an amylose solution containing over 50% amylose obtained from a natural starch having an amylose content of over 50% or obtained by separation from common starches, the improvement comprising:

prior to said film forming step, mixing short-chain amylose in which amylopectin is substantially absent, obtained by subjecting common starches to the action of $\alpha,1,6$-glucosidase until the amylopectin therein is debranched, with said amylose solution.

2. A process in accordance with claim 1 wherein: said natural starch is amylomaize starch.

3. A process in accordance with claim 1 wherein: said common starches are waxy starches.

4. A process in accordance with claim 1 wherein: said short chain amylose obtained by subjecting common starches to the action of $\alpha$-1,6-glucosidase until the amylopectin therein is debranched is further fractioned to yield low molecular weight amylose with polymerization degree of less than 50.

5. A process in accordance with claim 4 wherein: said low molecular weight amylose has an average polymerization degree of 20 to 30.

6. A process in accordance with claim 1 wherein: said short chain amylose is added in an amount by weight equal to or less than the amount of natural amylose.

7. A process in accordance with claim 6 wherein said amount of short chain amylose added is 10–50%.

8. A process in accordance with claim 4, wherein: said short chain amylose is added in an amount by weight not to exceed 40% of the total amylose mixture.

References Cited

UNITED STATES PATENTS

| | | | |
|---|---|---|---|
| 3,556,942 | 1/1971 | Hathaway | 195—31 R |
| 3,532,602 | 10/1970 | Seidman | 195—31 R |
| 3,312,560 | 4/1967 | Walton | 106—213 |
| 3,560,345 | 2/1971 | Yokobayashi | 195—31 R |

THEODORE MORRIS, Primary Examiner

U.S. Cl. X.R.

106—213